Patented Dec. 18, 1945

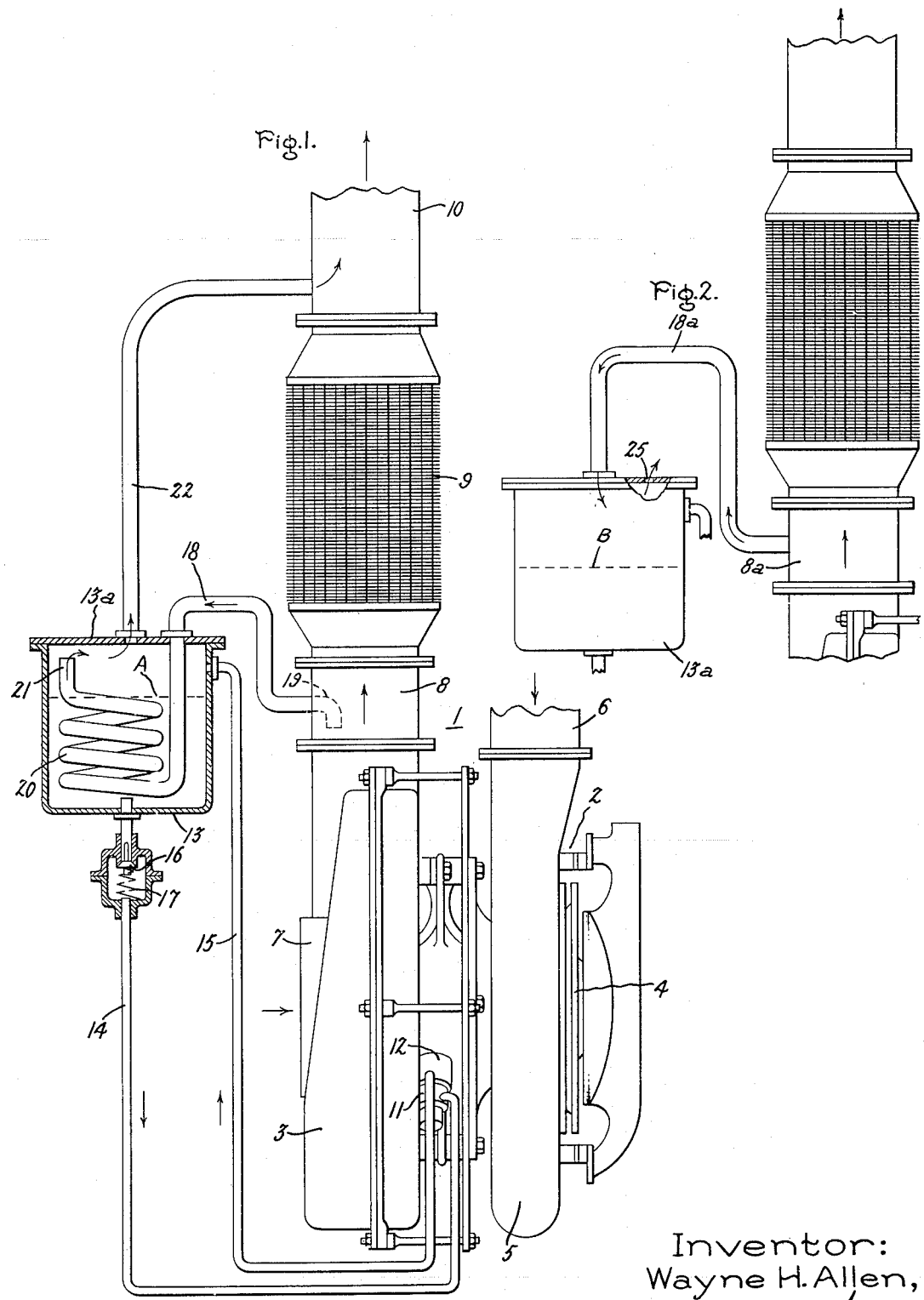

2,391,000

UNITED STATES PATENT OFFICE 2,391,000

LUBRICATING SYSTEM FOR AIRCRAFT SUPERCHARGERS

Wayne H. Allen, Los Angeles, Calif., assignor to General Electric Company, a corporation of New York Application March 16, 1942, Serial No. 434,793

3 Claims. (Cl. 184—6)

The present invention relates to superchargers for use on aircraft and especially to an improved lubricating system for such superchargers.

In connection with aircraft having superchargers driven either from the aircraft engine shaft or by exhaust gases from the aircraft engine or engines, it is customary to lubricate the supercharger with oil taken from an oil supply tank. This supply tank ordinarily is at a level on the aircraft above that of the supercharger and a supply pipe leads from the oil tank down to the supercharger pressure lubricant pump, usually a rotary pump driven through suitable gearing from the supercharger shaft, from which the oil flows to all parts to be lubricated and then to a sump in the supercharger casing. From the sump, the oil is returned by a scavenger pump to the oil tank. The oil tank may be for supplying oil for the supercharger only or it may be the same oil tank as is used to supply the engine or engines of the aircraft.

With such an arrangement, the pressure lubricant pump when running takes oil from the oil supply tank and discharges it to the parts to be lubricated. The flow of oil through the pressure lubricant pump depends upon the absolute pressure at the inlet of the pump and this in turn depends upon a number of factors among which are the head of oil, the pressure on the surface of the oil in the tank, and the temperature of the oil. The two latter are factors of considerable value and affect materially the operation of the pressure lubricant pump for at higher altitudes the altitude pressure becomes of relative low value and due to the low temperature at high altitudes, the oil may become thick and hence flows less freely.

The object of my invention is to provide an improved construction and arrangement of lubricating system wherein means are provided both for supercharging the oil tank, i. e., maintaining pressure on the surface of the oil in the tank higher than altitude atmospheric pressure, and for heating the oil in the tank.

For a consideration of what I believe to be novel and my invention, attention is directed to the following specification and the claims appended thereto.

In the drawing, Fig. 1 is a diagrammatic view of a lubricating system for an aircraft supercharger embodying my invention, and Fig. 2 is a similar view of a modification.

Referring to the drawing, I indicates an aircraft supercharger, in the present instance a gas driven supercharger, comprising a gas turbine 2 and a centrifugal compressor 3. The turbine wheel of the gas turbine is indicated at 4 and the nozzle box which supplies exhaust gases to the turbine wheel is indicated at 5. Exhaust gases from the aircraft engine are supplied to the nozzle box through a conduit 6. The compressor inlet is indicated at 7 and the compressor outlet is indicated at 8. From the outlet, compressed air is led through a cooler 9 and a conduit 10 to the points of consumption for the air, for example, an aircraft engine, an aircraft cabin, or both. 11 indicates a pressure lubricant pump and 12 indicates a scavenger pump. The lubricating oil tank is indicated at 13, the dotted line A indicating the level of the oil in the tank. The tank is sealed by a cover plate 13ª. The oil tank is connected to the inlet of the pressure lubricant pump by a pipe line or conduit 14. The outlet of the scavenger pump 12 is connected to the oil tank by a pipe line or conduit 15. Either one or both of the pipes 14 and 15 may be lagged with a heat insulating medium. The conduits leading from the pressure lubricant pump 11 to the bearings of the supercharger and from the sump to the inlet of the scavenger pump are not shown in the drawing, this being not needed for an understanding of the invention. In conduit 14 is a check valve 16 which opens outwardly and which is biased toward closed position by a spring 17.

Connecting conduit 8 on the discharge side of the compressor to the oil tank 13 is a pipe or conduit 18 which at its one end has a nozzle 19 facing against the direction of the flow of air through conduit 8, the nozzle 19 being in advance of the cooler 9 as regards the direction of the flow of air. When air is compressed in a centrifugal compressor, such as the supercharger 3, considerable heat is added to it, in fact so much heat that it becomes desirable to provide a cooler, such as cooler 9, through which the air passes on its way to the aircraft engine carburetor. A portion of the heated air discharged from the supercharger is conveyed through nozzle 19 and pipe or conduit 18 to the oil tank 13. Pipe 18 connects with the top of the oil tank and it may discharge the air directly into the tank above the surface of the oil therein. Preferably, however, I connect pipe 18 with one end of a heating coil 20 located below the surface of the oil in tank 13, the other end of the heating coil terminating above the level of the oil in the tank and preferably adjacent to the cover of the tank as is indicated at 21. With this arrangement, heated air is conveyed through conduit 18 and heating coil 20 and discharged in the upper portion of the oil tank above the level of the oil therein. The top of the oil tank is connected by a pipe or conduit 22 to conduit 10 beyond the cooler 9. There is a drop in air pressure across the cooler 9, the pressure in conduit 8 in advance of the cooler being somewhat higher than the pressure in conduit 10 beyond the cooler, the amount depending upon the drop in pressure which is necessary to effect flow of air through the cooler. This means that there is a difference in pressure between nozzle 19 and the upper end of pipe 22 which, coupled with the impact due to the fact that nozzle 19 faces into the air stream, effects a flow of heated air through pipe 18 to the oil tank and thence through pipe 22 to conduit 10. This heated air serves to heat the oil in tank 13. At the same time, due to the fact that tank 13, above the level of the oil therein, is connected to conduit 8, the surface of the oil will be subjected to the supercharger pressure. Thus, the oil tank will be both supercharged and heated. The purpose of check valve 16 is to prevent leakage of oil from tank 13 when the lubricant pump 11 is not running, i. e., when the supercharger is shut down.

In Fig. 2, I have shown a modification of my invention wherein both the heating coil 20 and the conduit 22 are omitted. In this modification, conduit 18ª, corresponding to conduit 18 in Fig. 1, conveys heated air from the conduit 8ª on the discharge side of the supercharger directly to the region above the level of the oil in tank 13ª, the level of the oil being indicated at B. In the cover of the oil tank is a small opening 25 which connects directly with the atmosphere and permits a circulation of heated air through the tank above the level of the oil therein. Opening 25 is small enough so that it permits of the needed flow of air through the tank to effect heating of the oil therein but at the same time checks the flow to such an extent that the pressure in the tank above the oil is but little lower than that in conduit 8ª on the discharge side of the supercharger compressor. Thus in the arrangement shown in Fig. 2, the oil in the tank is both heated and supercharged. Otherwise, the arrangement shown in Fig. 2 may be the same as that shown in Fig. 1.

What I claim as new and desire to secure by Letters Patent of the United States, is:

1. The combination with a supercharger system for an aircraft including an air cooler on the discharge side of the supercharger, of a lubricant tank, and conduit means connecting the tank above the lubricant therein to opposite sides of said air cooler to bypass compressed heated air with regard to the cooler in order to heat lubricant in the tank.

2. The combination with a supercharger system for an aircraft including an air cooler on the discharge side of the supercharger, of a lubricant tank, and conduit means connecting the tank above the lubricant therein to opposite sides of said air cooler to bypass compressed heating air with regard to the cooler in order to heat lubricant in the tank, the higher pressure connection having a nozzle which faces toward the flowing air stream in the supercharger.

3. The combination with a supercharger for an aircraft and a lubricant tank, of a heating coil in the tank having one end open to the space above the lubricant level in the tank, a conduit connecting the other end of the coil to the discharge side of the supercharger, and a conduit of restricted area connecting the tank above the lubricant level therein to a region of pressure lower than that to which the first-named conduit is connected whereby heated air is circulated through the coil for heating the lubricant and the tank is supercharged.

WAYNE H. ALLEN.